(12) United States Patent
diGirolamo et al.

(10) Patent No.: US 7,634,889 B1
(45) Date of Patent: Dec. 22, 2009

(54) ATTACHMENT FOR CONNECTING TWO BUILDING MEMBERS

(75) Inventors: Edward R. diGirolamo, Raleigh, NC (US); Michael L. Torres, Raleigh, NC (US); Nabil Abdel-Rahman, Raleigh, NC (US)

(73) Assignee: The Steel Networks, Inc., Durham, NC (US)

( * ) Notice: Subject to any disclaimer, the term of this patent is extended or adjusted under 35 U.S.C. 154(b) by 412 days.

(21) Appl. No.: 11/212,334

(22) Filed: Aug. 26, 2005

(51) Int. Cl.
*E04B 1/38* (2006.01)
(52) U.S. Cl. .................. 52/712; 52/655.1; 403/232.1
(58) Field of Classification Search ............... 52/712, 52/715, 204.2, 481.1, 481.2, 653.1, 655.1, 52/656.2, 656.9, 92.2, 289, 630, 93.1; 403/230, 403/232.1
See application file for complete search history.

(56) References Cited

U.S. PATENT DOCUMENTS

| | | | | | |
|---|---|---|---|---|---|
| 451,596 | A | * | 5/1891 | Longnecker | ............... 52/656.9 |
| 2,321,221 | A | * | 6/1943 | Linehan | ...................... 403/230 |
| 2,911,022 | A | * | 11/1959 | Brown | ........................ 269/40 |
| 3,188,696 | A | * | 6/1965 | Earhart | ........................ 52/241 |
| 3,256,030 | A | * | 6/1966 | Banse | ........................ 403/400 |
| 3,416,821 | A | * | 12/1968 | Benno | ........................ 411/458 |
| 4,196,556 | A | * | 4/1980 | Russo | ........................ 52/714 |
| 4,198,175 | A | * | 4/1980 | Knepp et al. | ................. 403/191 |
| 4,318,628 | A | * | 3/1982 | Mancini | ..................... 403/231 |
| 4,455,805 | A | * | 6/1984 | Rionda et al. | ................. 52/712 |
| 4,572,695 | A | * | 2/1986 | Gilb | ........................ 403/232.1 |
| 4,688,358 | A | * | 8/1987 | Madray | ..................... 52/93.2 |
| 4,817,359 | A | * | 4/1989 | Colonias | ..................... 52/643 |
| 5,150,982 | A | * | 9/1992 | Gilb | ........................ 403/232.1 |
| 5,170,977 | A | * | 12/1992 | McMillan | ................... 248/300 |
| 5,186,571 | A | * | 2/1993 | Hentzschel | ................. 403/231 |
| 5,403,110 | A | * | 4/1995 | Sammann | .................... 403/234 |
| 6,088,982 | A | * | 7/2000 | Hiesberger | ................... 52/241 |
| 6,094,880 | A | * | 8/2000 | Thompson | ................... 52/712 |
| 6,295,781 | B1 | * | 10/2001 | Thompson | ................... 52/712 |
| 6,640,516 | B1 | * | 11/2003 | Thompson | ................... 52/712 |
| 7,178,305 | B2 | * | 2/2007 | Petrova | ...................... 52/715 |
| 2004/0255535 | A1 | * | 12/2004 | Herren | ........................ 52/348 |
| 2005/0072099 | A1 | * | 4/2005 | Roesset et al. | ................ 52/633 |
| 2006/0010809 | A1 | * | 1/2006 | Lafreniere | ................. 52/489.1 |
| 2006/0096201 | A1 | * | 5/2006 | Daudet | ........................ 52/272 |
| 2007/0151192 | A1 | * | 7/2007 | Herren | ........................ 52/634 |

* cited by examiner

*Primary Examiner*—Brian E Glessner
*Assistant Examiner*—James J Buckle, Jr.
(74) *Attorney, Agent, or Firm*—Coats & Bennett, P.L.L.C.

(57) ABSTRACT

An attachment is provided for connecting two building members together such as a header and an adjoining support member. The attachment includes a plate having an engaging surface for extending across and in engagement with the two building members. At least one L-shaped bracket projects from the plate. The L-shaped bracket includes first and second tabs that form an angle of approximately 90° and which are offset with respect to the plate. The first and second tabs as well as the plate are adapted to be secured to the two building members.

4 Claims, 5 Drawing Sheets

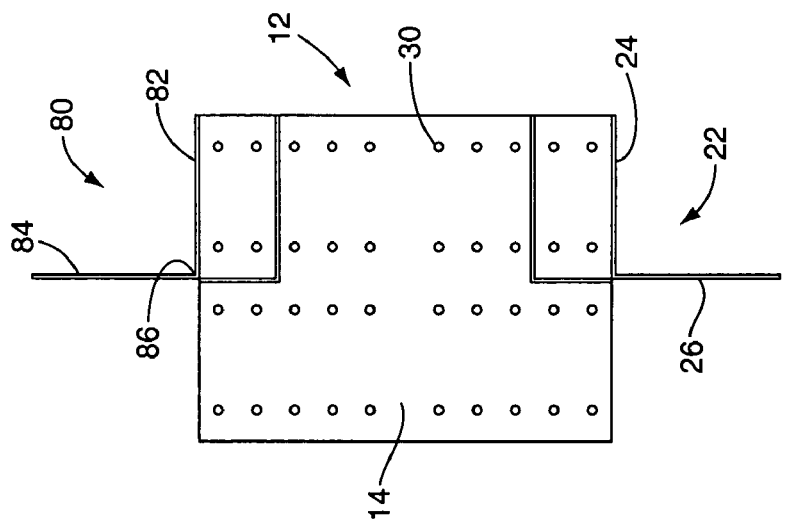
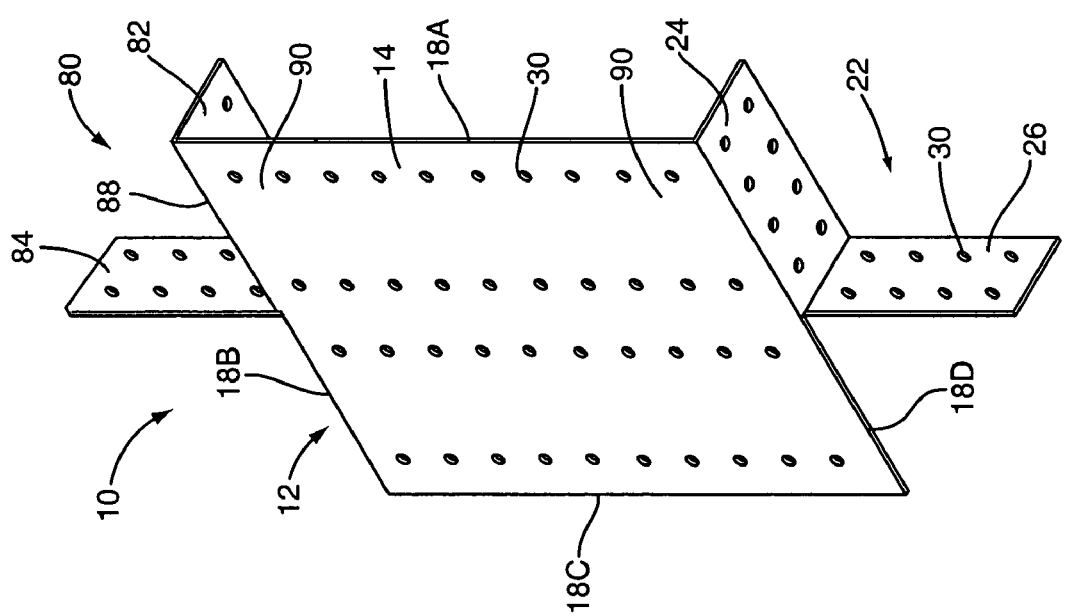

ATTACHMENT FOR CONNECTING TWO BUILDING MEMBERS

FIELD OF THE INVENTION

The present invention relates to attachments and clips for securing building components together, and more particularly to a metal attachment that can be used, for example, to secure a header to a vertical member in a wall system.

BACKGROUND OF THE INVENTION

Connecting building components in a building structure, whether they are metal or wood, present many challenges. For example, consider the concerns presented for efficiently and adequately connecting a header that extends across a window, door or throughway opening. Obviously any type of connector utilized must be able to safely carry the loads transferred to the header, which are often very substantial especially in cases where the header span is long. While it is important to provide sturdy and strong connections, it is also important that such be done in a way that generally minimizes the number of connectors or attachments used. From a cost and construction efficiency point of view, it is desirable that the connectors be relatively small and of a design that enables them to be easily installed even by individuals that are not highly skilled.

Therefore, there has been and continues to be a need for attachments that connect building components together which are structurally efficient, and which can be easily installed.

SUMMARY OF THE INVENTION

The present invention entails a metal attachment for connecting two building members together. The attachment comprises a plate for extending across a portion of the two members. At least one generally L-shaped bracket projects from the plate and includes first and second tabs or legs that are disposed at an angle with respect to each other, and which are offset with respect to the plate. The attachment can be utilized to connect various types of building members together. For example, where two members meet to form a corner, the plate portion of the attachment may extend across the aligned surfaces of the two members while the two tabs can be connected to the corner areas formed.

In another embodiment of the present invention, the attachment is provided with first and second generally L-shaped brackets. Each of the L-shaped brackets includes first and second tabs or legs that project from the plate and form an angle with respect to each other. Further, both sets of tabs are offset with respect to the plate.

Other objects and advantages of the present invention will become apparent and obvious from a study of the following description and the accompanying drawings, which are merely illustrative of such invention.

BRIEF DESCRIPTION OF THE DRAWINGS

FIG. 8 is a perspective view of the alternative embodiment of the attachment.

FIG. 9 is a front elevational view of the alternative design for the attachment.

DESCRIPTION OF THE INVENTION

Figure 1:
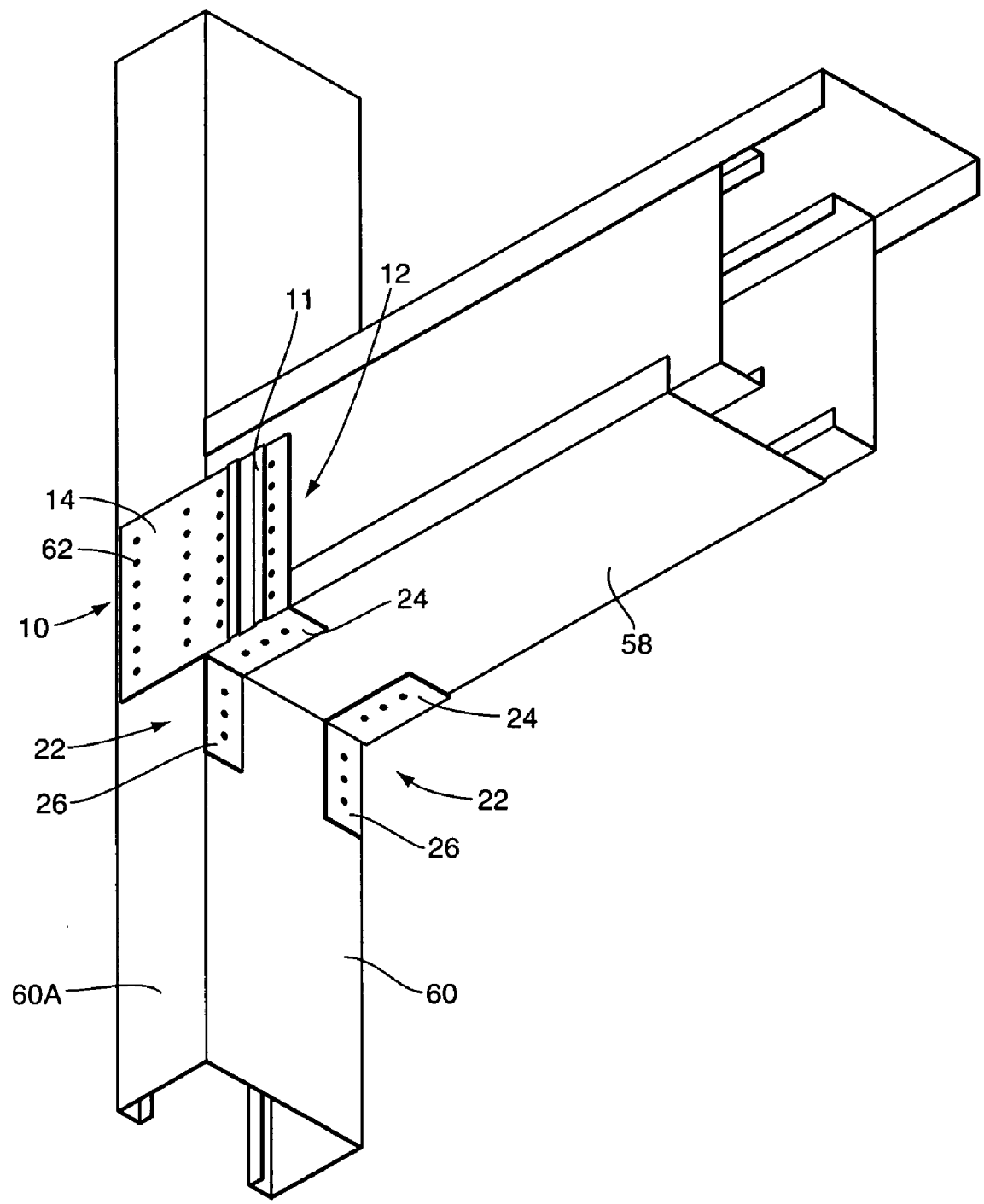
FIG. 1 is a fragmentary perspective view of a portion of a wall showing the attachment of the present invention securing two structural members together.
Figure 4:
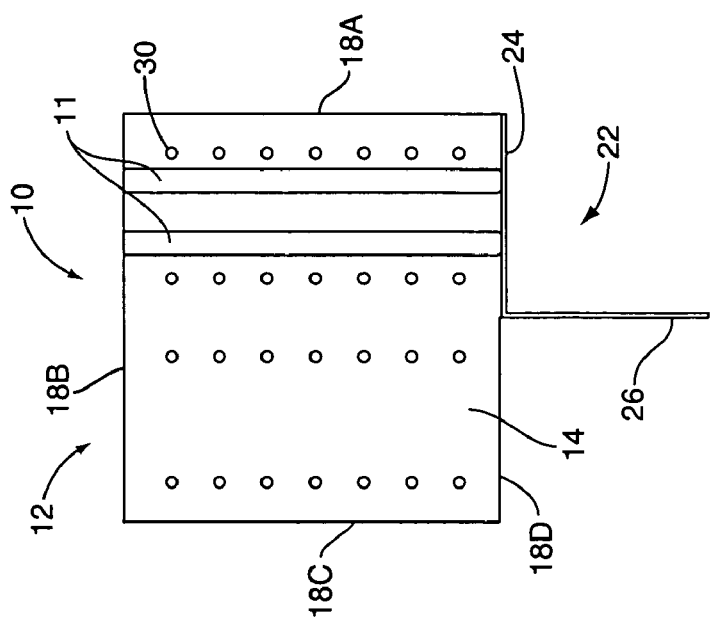
FIG. 4 is a front elevational view of the attachment.
Figure 5:
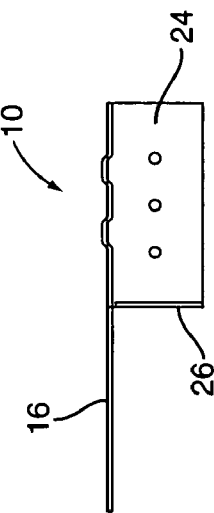
FIG. 5 is a top plan view of the attachment.
Figure 3:
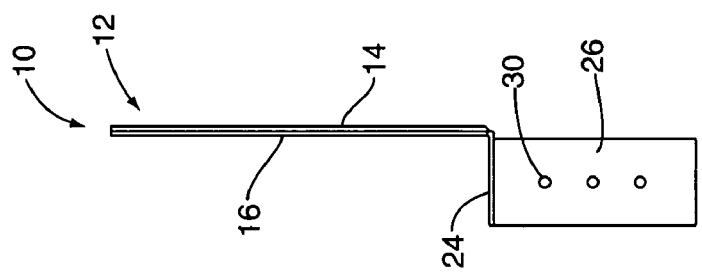
FIG. 3 is a side elevational view of the attachment.

With further reference to the drawings, particularly FIGS. 2-5, the attachment of the present invention is shown therein and indicated generally by the numeral 10. As will be appreciated from subsequent portions of the disclosure, attachment 10 is designed to connect two structural members together. In FIG. 1 for example, attachment 10 connects a header 58 with a jamb 60.

Figure 2:
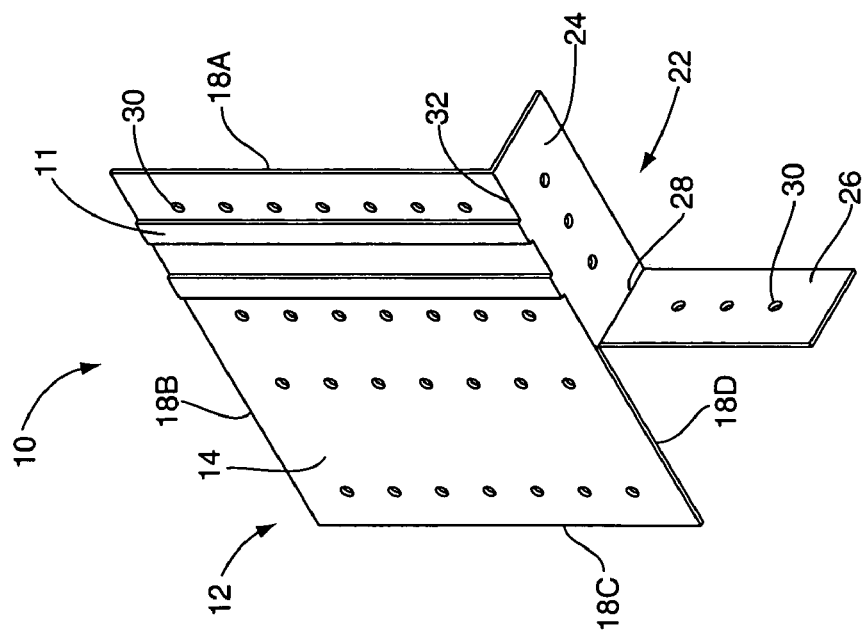
FIG. 2 is a perspective view of the attachment of the present invention.
Figure 6:
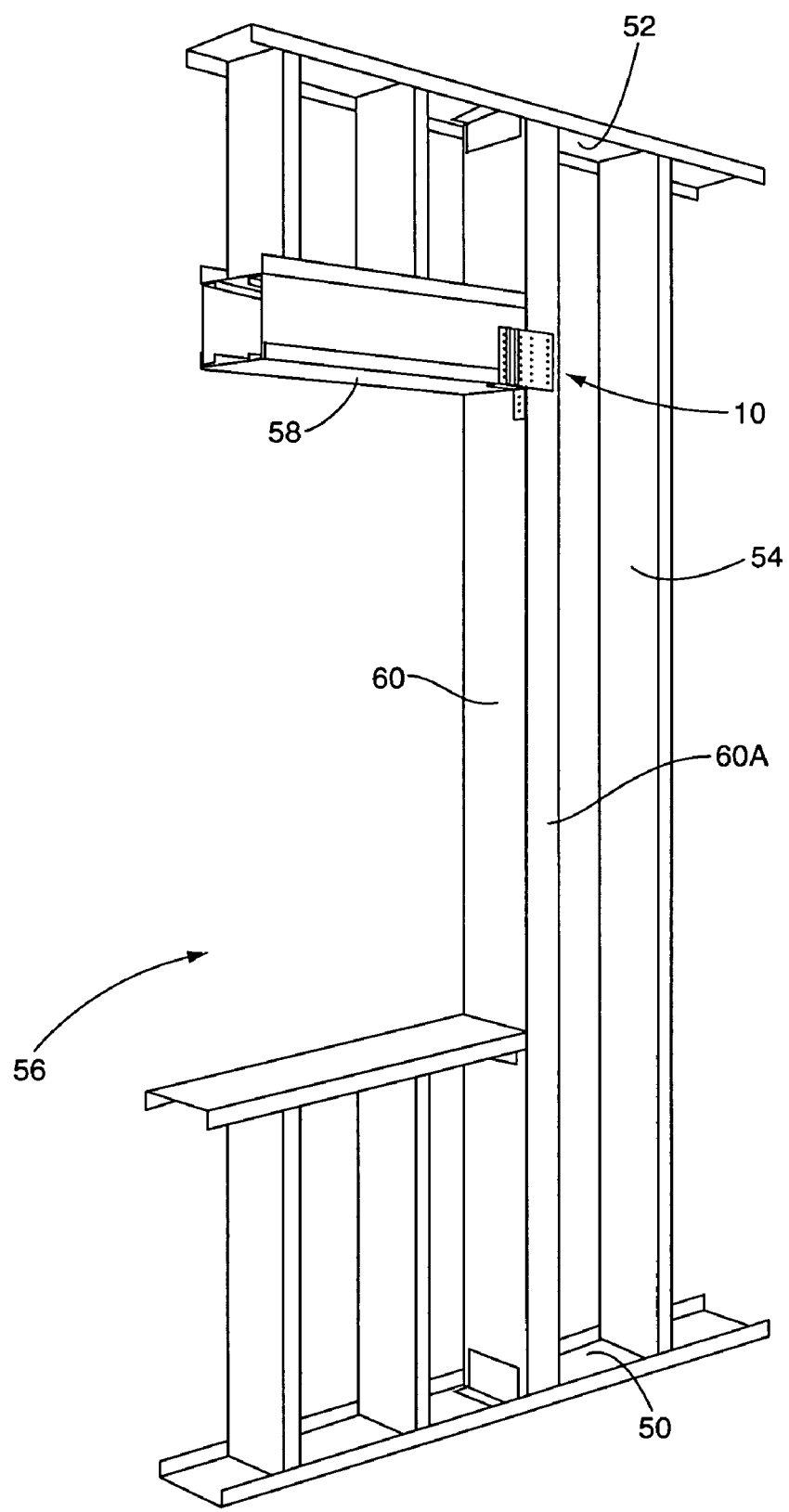
FIG. 6 is a fragmentary perspective view of a portion of a wall structure having the attachment incorporated therein.

Turning to a detailed discussion of the attachment 10, the same includes a plate indicated generally by the numeral 12. Plate 12 is of a rectangular or square design and includes a front face 14 and a back 16. Back 16, in the case of the design shown in FIGS. 2-5, will fit flush against the building members that the attachment 10 connects. Formed in the plate 12 is a pair of reinforcing ribs 11. Plate 12 includes a series of edges that surround the same. More particularly, as shown in FIG. 2, the edges include edge 18A, edge 18B, edge 18C, and edge 18D.

Projecting from the plate 12 is a bracket 22. Although the bracket may assume various configurations, in the case of the present embodiments bracket 22 assumes a generally L-shape. L-shaped bracket 22 includes a first tab or leg 24 and a second tab or leg 26. A transition line or juncture 28 extends between the tabs 24 and 26. The angle formed by tabs 24 and 26 can vary. In this embodiment, tabs 24 and 26 form a generally right angle.

Formed in the attachment 10 in both the plate and the tabs 24 and 26 are a series of fastener openings 30. Fastener openings 30 receive screws that effectively connect attachment 10 to adjacent building members.

Attachment 10 can be constructed in various ways utilizing various processes. In one embodiment it is contemplated that attachment 10 would be made from a single piece of material that is stamped and/or cut and formed into the configuration shown in FIG. 2. One way of forming the attachment 10 would be to cut a single piece of material along the line generally designated by the edge 18D. Note that the cut would only extend partially across the material. Thereafter tab 26 can be bent to an angle of approximately 90° with respect to the adjacent tab 24. Tab 24 could be bent towards the back 16 of the plate to the position shown in FIG. 2. In this position the plane of tab 24 would extend generally perpendicular to the plane of the plate 12. The plane of tab 26 would extend generally perpendicular to the plane of tab 24 and also generally perpendicular to the plane of the plate 12. It is noted that a juncture or transition line 32, as viewed in FIG. 2, would be formed between the plate 12 and the tab 24. Note that the juncture or transition line 32 would generally be aligned with edge 18D as shown again in FIG. 2.

Figure 7:
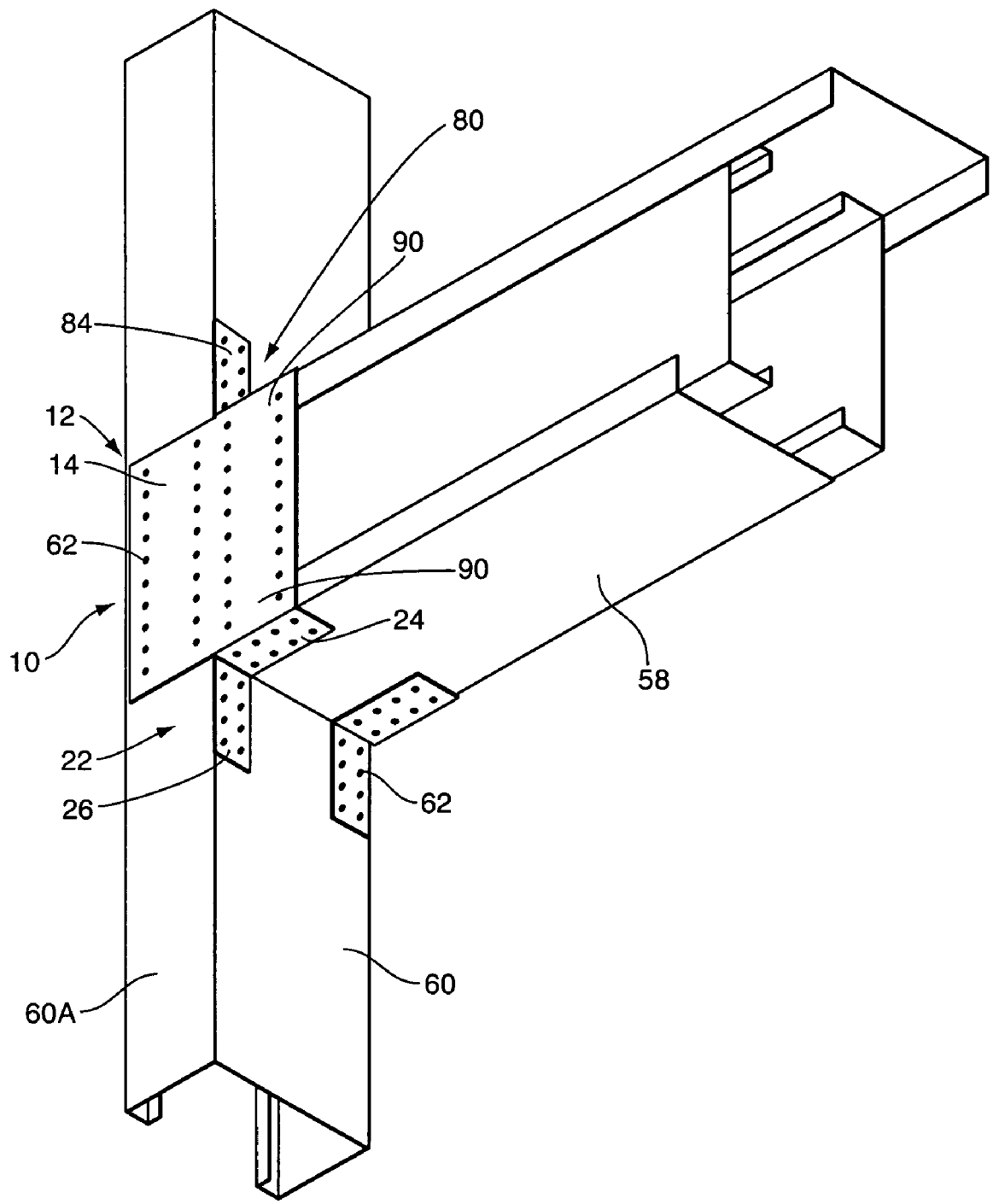
FIG. 7 is a fragmentary perspective view of a portion of a wall structure showing an alternative embodiment for the attachment.

Attachment 10 described above is designed to be utilized in wall systems such as a metal wall system or a wood wall system. Shown in FIGS. 1 and 7 is an exemplary metal wall system. This metal wall system includes a lower track 50 and an upper track 52. A plurality of studs 54 extend between the lower track 50 and the upper track 52. Formed in the wall is an opening indicated generally by the numeral 56. A header 58 extends transversely across an upper portion of the opening. A jamb or vertical member 60 also forms a part of the opening and generally extends vertically along a portion of the opening. As illustrated in FIG. 1, the header 58 abuts against the jamb 60 so as to form a corner area underneath the header 58 and adjacent the jamb 60, and above the header 58 and adjacent the jamb 60.

To secure the header 58 to the jamb 60 the attachment 10 is utilized. Plate 12 is extended across a side portion of the header 58 and a flange portion 60A of the jamb 60. A series of fasteners 62, such as screws, are inserted through the fastener openings 30 in the plate and on through the header 58 and jamb 60. These fasteners 62 secure the plate 12 to both the header 58 and the jamb 60.

Once the plate 12 is positioned adjacent the header 58 and jamb 60, the L-shaped bracket 22 will fit in the corner area defined between the bottom of the header 58 and the web of the jamb 60. Again, fasteners 62 such as screws, are screwed through the fastener openings 30 in both the tabs 24 and 26. Thus, the tabs are secured to both the header 58 and the jamb 60.

Turning to FIGS. 7-9, a second or alternative embodiment is shown for the attachment 10. The second embodiment is similar to the first embodiment described above with the exception that a second bracket is added to the plate 12. More particularly, as viewed in FIG. 7, a second bracket projects from the plate 12 and is indicated generally by the numeral 80. Second bracket 80 assumes a generally L-shape. While the particular angle formed by the bracket can vary, just as in the case with the first embodiment, in the design illustrated herein the angle formed by the bracket 80 is generally a right angle, or an angle of approximately 90°. Similar to the bracket described above, the second bracket 80 includes a first tab or leg 82 and a second tab or leg 84. Both tabs include fastener openings 30. Second tab 84 is bent or otherwise disposed at an angle to the first tab 82 such that a transition line or juncture 86 is formed therebetween. See FIG. 9. In addition, there is a juncture or transition line 88 formed between the first tab 82 and the plate 12.

Although not required, the attachment 10 shown in FIGS. 7-9 is provided with a series of reinforcing plates 90. In this case, a reinforcing plate is positioned on the plate 12 in a corner area adjacent one of the brackets 22 or 80. This is particularly illustrated in FIGS. 7 and 8.

Turning to FIG. 7, the attachment shown in FIGS. 8 and 9 is shown therein connected between the header 58 and jamb 60 that forms a part of a wall structure. Note again that plate 12 extends across a portion of header 58 and a portion of the flange 60A of the jamb 60. Screws 62 are inserted through the fastener openings in the plate 12 and into the respective structural members. This connects or ties the header 58 to the jamb 60. In addition, both brackets 22 and 80 are fastened to corner areas formed by the header 58 abutting into the jamb 60. In this case the second bracket 80 is secured atop the header and abuts with both the top surface of the header 58 and the face or web of the jamb 60. Again, fasteners 62 such as screws are screwed through the tabs 82 and 84 and into the adjacent or underlying structure.

From the foregoing specification and discussion, it is seen that the attachment 10 of the present invention forms a simple attachment or clip that can easily be utilized to connect two building framing members together. Because of the design and simplicity, the attachment 10 is easy to install and provides a rigid and strong connection for connecting two structural members, such as a header 58 and a jamb 60.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A metal attachment for connecting two or more building members together comprising:
   a. a plate having a flat engagement surface for engaging one or more building components, the plate being generally rectangular and substantially planar, and including:
      i. a series of edges that surround the plate;
      ii. a series of corners formed by the edges;
   b. a generally L-shaped bracket projecting from the substantially planar plate, the L-shaped bracket including:
      i. a first generally planar rectangular shaped leg extending along a portion of a first edge of the plate and including a terminal end that begins at approximately a first corner of the plate, and wherein the first leg extends from the first corner along the first edge to a juncture at an intermediate point on the first edge, the juncture formed by a bend;
      ii. a second generally planar rectangular shaped leg disposed generally perpendicular to the plate and the first leg, and wherein the second leg begins at the juncture and projects outwardly from the plate; and
   c. at least one elongated reinforcing rib disposed on the generally rectangular and substantially planar plate wherein a longitudinal axis of the rib lies generally perpendicular to the first edge of the plate, and wherein the rib:
      i. includes a length and a width, the length being substantially longer than the width;
      ii. extends from a portion of the first edge disposed between the first corner and the intermediate point; and
      iii. is oriented such that the length of the rib is generally perpendicular to the first edge of the plate.

2. The metal attachment of claim 1 including fastener openings formed in the plate and the L-shaped bracket.

3. A wall system for a building, comprising:
   a. a plurality of studs;
   b. an opening in the wall system;
   c. a header extending across the opening;
   d. a vertical member forming a part of the opening;
   e. the header and vertical member forming a corner area of the opening;
   f. the metal attachment of claim 1 connecting the header to the vertical member;
   g. the plate of the attachment extending across both the header and the vertical member, and wherein the L-shaped bracket attaches in the corner area where one leg attaches to an underside of the header and the other leg attaches to the vertical member;
   h. the first and second generally planar rectangular shaped legs extending from the bend that forms the juncture at an intermediate point on the first edge of the plate; and
   i. a series of fasteners extending through fastener openings formed in the plate and the L-shaped bracket for securing the attachment to the header and vertical member.

4. The wall system of claim 3 wherein two separate attachments connect the header and vertical member, one attachment connected on a first side of the header and vertical member and another attachment connected on a second side of the header and vertical member.

\* \* \* \* \*